United States Patent
Noda et al.

(10) Patent No.: US 6,203,096 B1
(45) Date of Patent: Mar. 20, 2001

(54) ENERGY ABSORBING STRUCTURE OF VEHICULAR DOOR

(75) Inventors: Shuji Noda, Toyota; Sotaro Kumazawa, Nagoya, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/313,354

(22) Filed: May 18, 1999

(30) Foreign Application Priority Data

May 26, 1998 (JP) .................................................. 10-144454

(51) Int. Cl.⁷ ........................................................ B60J 5/00
(52) U.S. Cl. .................................. 296/146.6; 296/146.5; 296/146.7; 280/751
(58) Field of Search ............................. 296/146.6, 146.7, 296/146.5; 280/748, 751

(56) References Cited

U.S. PATENT DOCUMENTS

| | | | |
|---|---|---|---|
| 4,769,951 | * | 9/1988 | Kaaden ............................... 296/146.6 |
| 4,783,114 | * | 11/1988 | Welch ................................... 280/751 |
| 4,786,100 | * | 11/1988 | Kleemann et al. ................. 296/146.6 |
| 5,040,335 | * | 8/1991 | Grimes ............................... 296/146.7 |
| 5,102,163 | * | 4/1992 | Ishikawa ............................... 280/751 |
| 5,306,066 | * | 4/1994 | Saathoff ............................. 296/146.6 |
| 5,395,135 | * | 3/1995 | Lim et al. ............................. 280/751 |
| 5,433,478 | * | 7/1995 | Naruse ................................... 280/751 |
| 5,482,344 | * | 1/1996 | Walker et al. ..................... 296/146.7 |
| 5,542,738 | | 8/1996 | Walker et al. ......................... 296/189 |
| 5,544,913 | * | 8/1996 | Yamanishi et al. ................... 280/751 |
| 5,573,272 | | 11/1996 | Teshima ............................... 280/751 |
| 5,573,298 | | 11/1996 | Walker et al. ......................... 296/188 |
| 5,577,794 | | 11/1996 | Gandhi et al. ..................... 296/146.6 |
| 5,588,692 | | 12/1996 | Gandhi et al. ..................... 296/146.7 |
| 5,595,415 | * | 1/1997 | Beaulet ............................. 296/146.5 |
| 5,707,098 | * | 1/1998 | Uchida et al. ..................... 296/146.6 |
| 5,749,600 | * | 5/1998 | Yamada et al. ....................... 280/751 |

FOREIGN PATENT DOCUMENTS

| | | | | |
|---|---|---|---|---|
| 4224303 | * | 1/1994 | (DE) | ................................ 296/146.6 |
| 4237584 | * | 5/1994 | (DE) | ................................ 296/146.6 |
| 2275660 | * | 9/1994 | (GB) | ................................ 296/146.6 |
| 403028020 | * | 2/1991 | (JP) | ................................ 296/146.6 |
| 403045421 | * | 2/1991 | (JP) | ................................ 296/146.6 |
| 406255365 | * | 9/1994 | (JP) | ................................ 296/146.6 |
| 8-67140 | | 3/1996 | (JP) . | |
| 8-238931 | | 9/1996 | (JP) . | |
| 9-71200 | | 3/1997 | (JP) . | |
| 2549364 | | 6/1997 | (JP) . | |
| 9-207696 | | 8/1997 | (JP) . | |

* cited by examiner

*Primary Examiner*—Joseph D. Pape
*Assistant Examiner*—Kiran B. Patel
(74) *Attorney, Agent, or Firm*—Pillsbury Winthrop LLP

(57) ABSTRACT

An energy absorbing structure of a vehicular door has an energy absorbing member that is disposed on a compartment side of an inner panel, at such a position as to substantially face a hip of an occupant sitting on a seat. The energy absorbing member has a block or container shape. A generally rectangular protruded portion is formed together with the energy absorbing member. The protruded portion is protruded from a front-to-rear middle portion of an upper end portion of a bottom wall of the energy absorbing member that faces the inner panel when the energy absorbing member is mounted. The bottom wall has an increased wall thickness and therefore resists bending deformation. The protruded portion is designed so that the protruded portion is substantially prevented from undergoing compression deformation at the time of impact. In a door assembly, the protruded portion protrudes from a service hole formed in the inner panel toward to an outer panel. A substantially vertically extending windowpane regulator guide is disposed at a side of the protruded portion, the side being opposite from the compartment. The windowpane regulator guide is spaced from the protruded portion by a small clearance.

19 Claims, 7 Drawing Sheets

ENERGY ABSORBING STRUCTURE OF VEHICULAR DOOR

INCORPORATION BY REFERENCE

The disclosure of Japanese Patent Application No. HEI 10-144454 filed on May 26, 1998 including the specification, drawings and abstract is incorporated herein by reference in its entirety.

BACKGROUND OF THE INVENTION

1. Field of the Invention

The present invention relates to an energy absorbing structure of a vehicular door.

2. Description of the Related Art Side doors of motor vehicles incorporate an energy absorbing structure for reducing the impact on an occupant body when the occupant body forcefully contacts an inner door side portion thereof that faces the compartment. An example of such a structure is disclosed in Japanese Patent Application Laid-Open No. HEI 9-71200.

In the disclosed vehicular door energy absorbing structure, as shown in FIG. 9, a first energy absorbing member 72 is disposed on a door inner side of a door trim (also termed "door lining") 70 of a door 78, and a second energy absorbing member 74 having a greater rigidity than the first energy absorbing member 72 is mounted to the first energy absorbing member 72 in such a manner that the second energy absorbing member 74 is disposed closer to an outer panel 76 of the door 78. In this manner, the interval between the second energy absorbing member 74 and an impact beam 82 is reduced. Therefore, if the door 78 is deformed inwards by an impact thereon from the outside in a direction of the width of the vehicle, the impact beam 82 comes into contact with the second energy absorbing member 74 immediately after the first energy absorbing member 72 and the body of an occupant 80 impact.

In this vehicular door energy absorbing structure, however, a space for vertical movements of a door glass pane 84 must be provided between the second energy absorbing member 74 and the impact beam 82. This space needs to have a sufficient width that allows for a play of the door glass pane substantially in the directions of the width of the vehicle. This results in an increased thickness of the door, that is, an increased dimension thereof substantially in the vehicle width directions and therefore a reduced compartment width. Furthermore, if another vehicle crashes into a portion of the door 78 that is remote from the impact beam 82, for example, a portion of the door 78 far above the impact beam 82, deformation of the outer panel 76 does not reduce the interval between the impact beam 82 and the second energy absorbing member 74. That is, the pre-deformation displacement of the second energy absorbing member 74 that occurs before the second energy absorbing member 74 is brought into contact with the impact beam 82 by the body of the occupant 80 pushing the first energy absorbing member 72 is not reduced from the designed interval between the second energy absorbing member 74 and the impact beam 82 in the vehicular door impact absorbing structure. Therefore, the start of energy absorption correspondingly delays. In order to ensure that a desired amount of energy will be absorbed even in the aforementioned case, an energy absorbing member having an increased thickness, that is, an increased dimension in the directions of the vehicle width, needs to be used. In turn, the volume of the interior compartment space reduces.

SUMMARY OF THE INVENTION

Accordingly, it is an object of the present invention to provide an energy absorbing structure of a vehicular door that is capable of efficiently absorbing impact energy without reducing the designed size of the compartment.

According to the invention, there is provided an energy absorbing structure of a vehicular door including an energy absorbing member provided between a door inner panel and a door trim, and a reinforcing member fixed to the door and extending in an up-down direction. The energy absorbing member has a protruded portion that is formed integrally with the energy absorbing member on a side of the energy absorbing member, the side being opposite from a compartment. The protruded portion resists deforming at the time of an impact. The protruded portion faces the reinforcing member via an opening formed in the door inner panel.

Therefore, when the occupant contacts the inner side of the door as a secondary impact at the time of a side collision with another vehicle or the like, the energy absorbing member moves outwards in a direction of the vehicle width. During the second impact, the protruded portion formed together with the energy absorbing member comes into contact with the reinforcing member fixed to the door and extending in the up-down direction, via the opening formed in the door inner panel. Furthermore, since the reinforcing member is fixed to the door, there occurs substantially no movement of the reinforcing member relative to the energy absorbing member when the door is used, for example, opened or closed, or when the door glass pane is raised or lowered. Therefore, the invention makes it possible to adopt an arrangement in which the reinforcing member and the protruded portion of the energy absorbing member are close to each other. That is, it is possible to reduce the pre-deformation displacement of the energy absorbing member that occurs before the energy absorbing member, excluding the protruded member, starts to deform (buckle) at the time of an impact. Therefore, energy absorption starts earlier than it would if a vehicular door energy absorbing structure without a protruded portion was used, and energy absorbing efficiency improves.

Furthermore, since the reinforcing member extends in an up-down direction, the load applied to a door outer panel is transmitted to the energy absorbing member via the reinforcing member even in a case where another vehicle crashes into an upper or lower portion of the door. Therefore, the energy absorption by the energy absorbing member starts earlier, thereby absorbing energy at a high efficiency.

Thus, the invention eliminates the need to increase the thickness of the energy absorbing member, that is, the dimension thereof in the direction of the vehicle width, in order to ensure that a predetermined amount of impact energy will be absorbed. As a result, a wide and large compartment space can be provided.

In the energy absorbing structure of a vehicular door of the invention, the reinforcing member may be a window-pane regulator guide fixed at its upper and lower end portions to the door inner panel, and the opening may be a service hole. This construction eliminates the need to separately provide a reinforcing member and the need to separately provide an opening in the door inner panel.

Furthermore, in the invention, the energy absorbing member may have a plurality of ribs. The plurality of ribs may be grating ribs including at least one horizontal rib extending in a front-rear direction relative to a vehicle and at least one vertical rib extending in a top-bottom direction relative to the vehicle. At the time of a side impact, the ribs undergo compression deformation, and then buckle at a predetermined load, thereby absorbing energy.

Further, the protruded portion may have a plurality of ribs in an inner space at least partially defined by the protruded portion. The protruded portion may also be filled with a resin material. This construction substantially prevents compression deformation of the protruded portion during an initial period of an impact.

The energy absorbing member may be disposed at such a position as to substantially face a hip part of an occupant being at a predetermined position.

Further, the energy absorbing structure of a vehicular door of the invention may further include a plurality of impact beams extending at a side of the reinforcing member, the side being opposite from the compartment. The impact beams are inter-spaced at a predetermined interval extending in the up-down direction relative to the vehicle. A height of the protruded portion in the up-down direction relative to the vehicle may be within the predetermined interval.

In this construction, if another vehicle crashes into a forward portion of the door or a rearward portion of the door, the load applied to the door outer panel can be transmitted to the energy absorbing member by the impact beams and the reinforcing member. Therefore, the energy absorption by the energy absorbing member starts earlier, so that impact energy can be absorbed at a high efficiency.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENT

Figure 1:
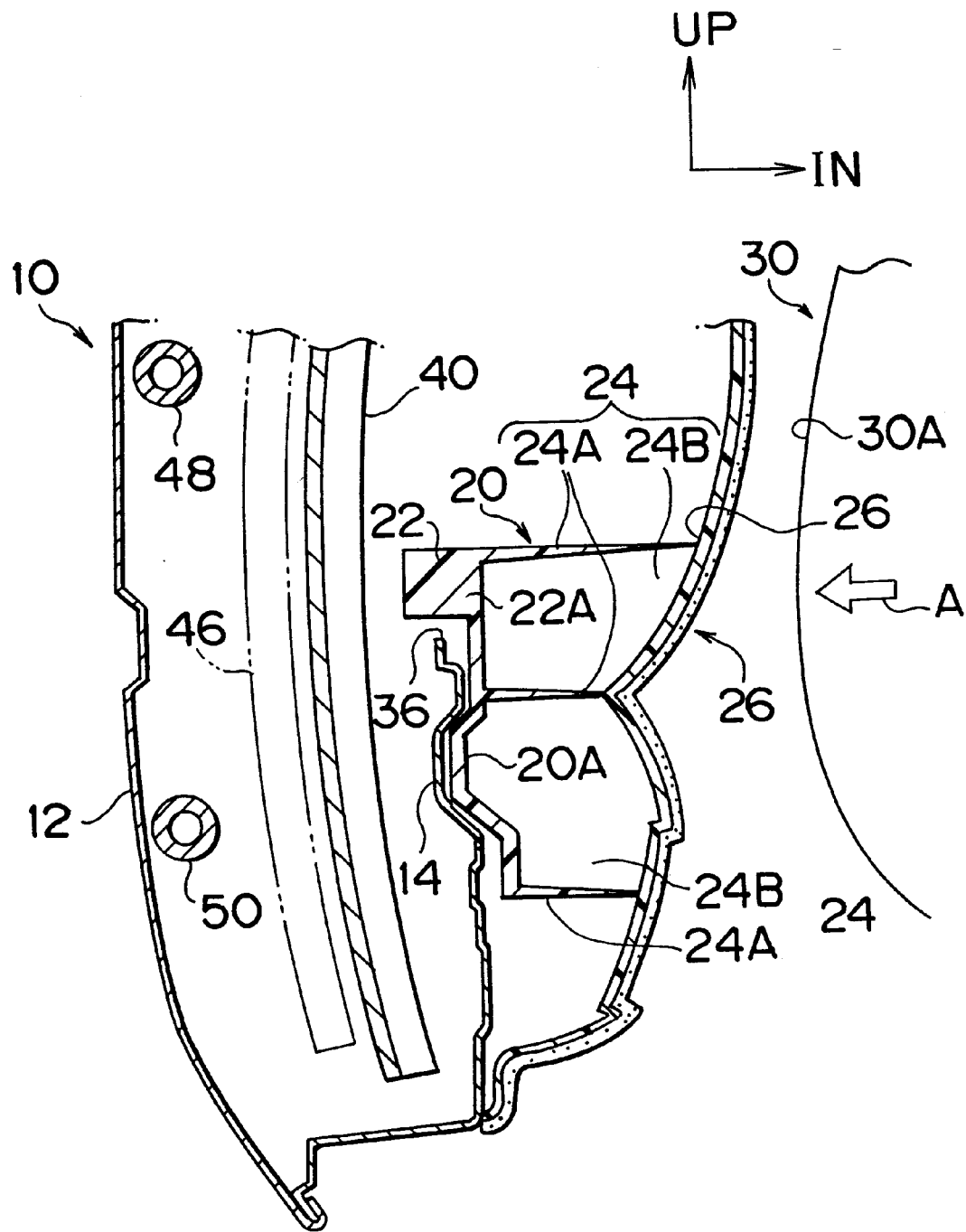
FIG. 1 is an enlarged sectional view taken on line I—I in FIG. 2.

A preferred embodiment of the energy absorbing structure of a vehicular door of the present invention will be described in detail hereinafter with reference to FIGS. 1 through 7.

In the drawings, arrows FR indicate a forward direction relative to a vehicle, arrows IN indicate an inward direction relative to the vehicle, and arrows UP indicate an upward direction relative to the vehicle.

Referring first to FIG. 1, a front side door 10 has a front side door outer panel 12 (hereinafter, simply referred to as "outer panel 12") that forms an outer side portion of the front side door 10, the outer side thereof being remote from the compartment, and a front side door inner panel 14 (hereinafter, simply referred to as "inner panel 14") that forms an inner side portion of the front side door 10, the inner side being closer to the compartment. An energy absorbing member 20 is disposed at the compartment side of the inner panel 14, at such a position as to substantially face a hip 30A of an occupant 30 sitting on a seat.

Figure 3:
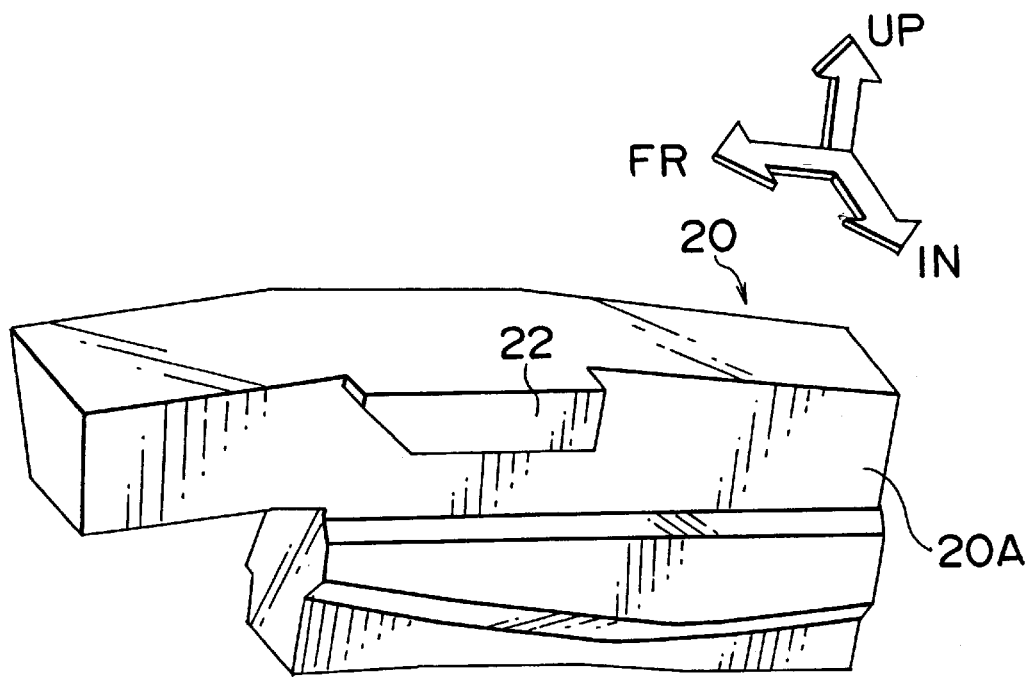
FIG. 3 is a perspective view of an energy absorbing member used in the vehicular door energy absorbing structure of the embodiment, viewed from an outwardly forward point relative to the vehicle.

Referring to FIG. 3, the energy absorbing member 20 is formed from a resin material into a block or container shape. A generally rectangular protruded portion 22 is formed together with the energy absorbing member 20. More specifically, the protruded portion 22 is protruded from a front-to-rear middle portion of an upper end portion of a bottom wall 20A of the container-shaped energy absorbing member 20 that faces the inner panel 14 when the energy absorbing member 20 is mounted. The bottom wall 20A has a wall thickness that is greater than the plate thickness of energy absorbing ribs (buckling ribs) 24 described below, and therefore resists bending deformation.

Figure 4:
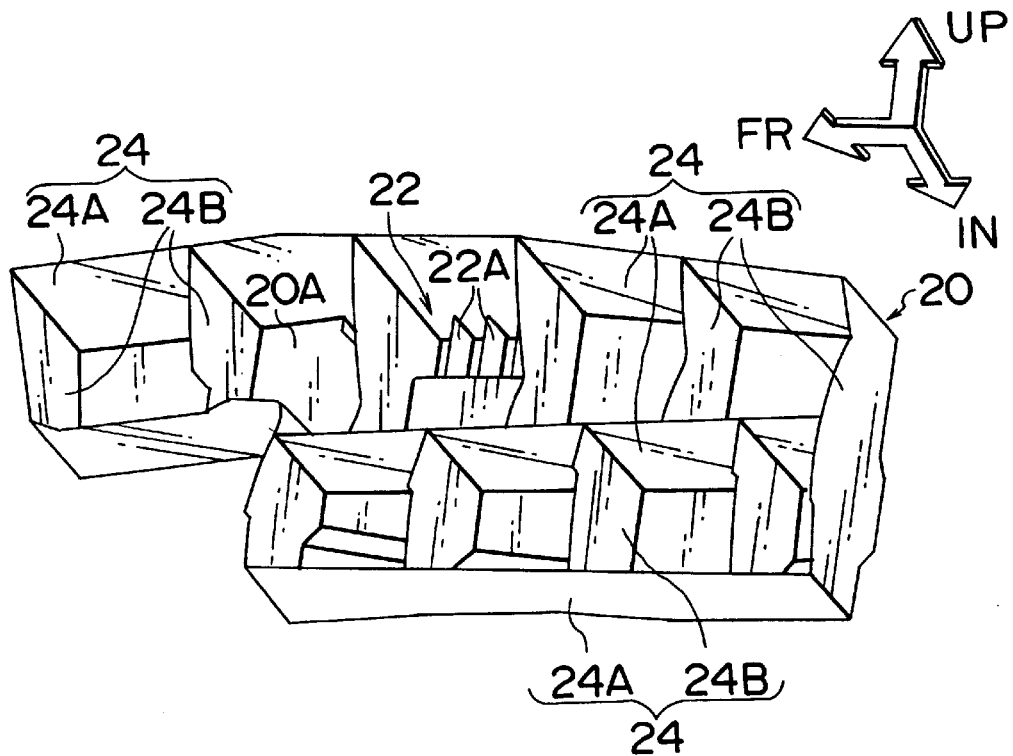
FIG. 4 is a perspective view of the energy absorbing member used in the vehicular door energy absorbing structure of the embodiment, viewed from an inwardly rearward point relative to the vehicle.
Figure 5:
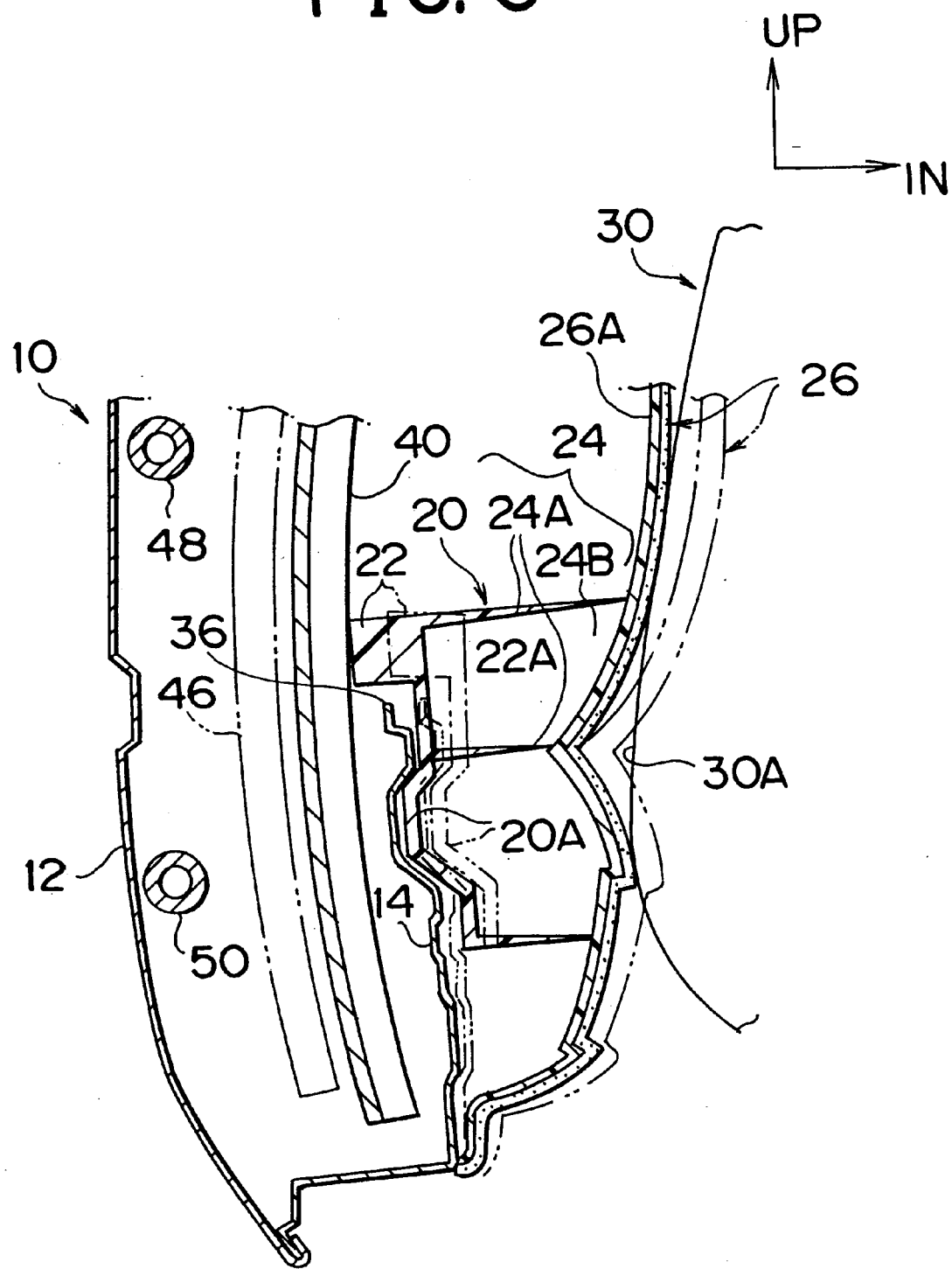
FIG. 5 illustrates the operation of the vehicular door energy absorbing structure of the embodiment.

Referring to FIG. 4, the protruded portion 22 of the energy absorbing member 20 includes a plurality of reinforcing ribs 22A extending in top-to-bottom directions and spaced from one another at a short pitch in front-to-rear directions. Therefore, the protruded portion 22 is substantially prevented from undergoing compression deformation during an initial period of an impact. The protruded portion 22 of the energy absorbing member 20 may also be filled with a resin material.

The energy absorbing member 20 further includes the buckling ribs 24 extending from the bottom wall 20A toward the compartment. The buckling ribs 24 form a grating structure including horizontal ribs 24A extending in front-to-rear directions relative to the vehicle and vertical ribs 24B extending in top-to-bottom directions relative to the vehicle. The buckling ribs 24 are designed so that at the time of an impact on the vehicle, the buckling ribs 24 undergo compression deformation, and then buckle at a predetermined load so as to absorb impact energy. Vertical ribs 24B located at upper positions and vertical ribs 24B located at lower positions are shifted from each other (arranged in an offset pattern) in the front-to-rear directions. The pitch of the aforementioned reinforcing ribs 22A is smaller than the pitch of the buckling ribs 24. Therefore, if receiving a load in a direction of the width of the vehicle, the buckling ribs 24 buckle prior to the reinforcing ribs 22A.

Referring back to FIG. 1, a door trim 26 is disposed at a compartment side of the energy absorbing member 20. The energy absorbing member 20 is secured to a reverse surface 26A of the door trim 26 by using an adhesive or the like. The bottom wall portion 20A of the energy absorbing member 20 faces the inner panel 14 and is located adjacent thereto in the door assembly. The protruded portion 22 of the energy absorbing member 20 protrudes outward from a service hole 36 (an opening) formed in the inner panel 14, toward the outer panel 12. A windowpane regulator guide 40 that serves also as a reinforcing member is disposed at a side of the protruded portion 22, the side being remote from the compartment. The windowpane regulator guide 40 is spaced from the protruded portion 22 by a small clearance.

Figure 2:
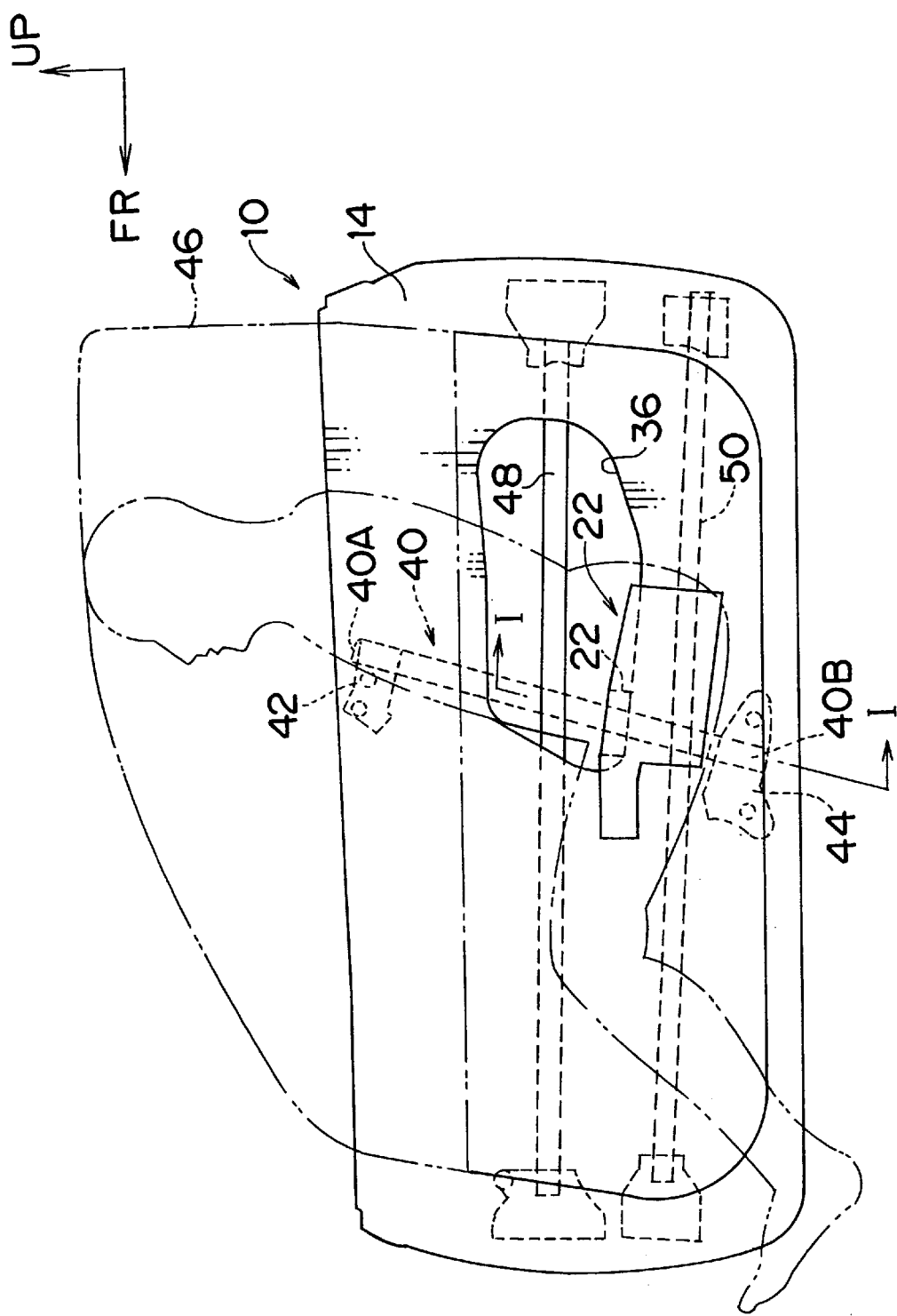
FIG. 2 is a side view of a front side door incorporating a energy absorbing structure of a vehicular door according to an embodiment of the invention, in which a door trim is omitted.

Referring to FIG. 2, the windowpane regulator guide 40 extends in top-to-bottom directions. An upper end portion 40A of the windowpane regulator guide 40 is fastened to an upper portion of the reverse surface of the inner panel 14, that is, the surface thereof opposite from the compartment, by using a bracket 42. A lower end portion 40B of the windowpane regulator guide 40 is fastened to a lower portion of the reverse surface of the inner panel 14 by using a bracket 44.

Referring to FIG. 1 again, an upper impact beam 48 and lower impact beam 50 are disposed at an outer panel side of the windowpane regulator guide 40, leaving therebetween a space for vertical movements of a door glass pane 46. The upper impact beam 48 extends in front-to-rear directions at a vertical position corresponding to a lower portion of the windowpane regulator guide 40. A height of the protruded portion 22 of the energy absorbing member 20 in the top-bottom directions is positioned between the upper impact beam 48 and the lower impact beam 50.

The operation of the vehicular door energy absorbing structure of this embodiment will be described.

In a case where the hip 30A of the occupant 30 forcefully comes into contact with the energy absorbing member 20 in a substantially horizontal direction (as indicated by arrow A in FIG. 1) at the time of, for example, a side collision with another vehicle, the load of the occupant 30 acts on the energy absorbing member 20 via the door trim 26. Therefore, the door trim 26, the energy absorbing member 20 and the inner panel 14 move toward the outer panel 12, more specifically, from a position indicated by two-dot lines in FIG. 5 to a position indicated by solid lines in FIG. 5. The protruded portion 22 of the energy absorbing member 20 protruding outward from the service hole 36 of the inner panel 14 comes into contact with the windowpane regulator guide 40, which is fastened to the inner panel 14 and extends in the top-to-bottom directions. The load applied to the energy absorbing member 20 acts on the buckling ribs 24 via the protruded portion 22. The buckling ribs 24 then becomes compressed and buckled, thereby absorbing impact energy of the load.

As described above, the upper end portion 40A and the lower end portion 40B of the windowpane regulator guide 40 are fastened to the inner panel 14, so that there occurs substantially no movement of the windowpane regulator guide 40 relative to the protruded portion 22 of the energy absorbing member 20 when the front side door 10 is used, that is, opened or closed, or when the door glass pane 46 is raised or lowered. Therefore, it becomes possible to adopt an arrangement in which the windowpane regulator guide 40 is disposed close to the protruded portion 22 of the energy absorbing member 20. That is, it becomes possible to reduce the pre-deformation displacement of the energy absorbing member 20 (the displacement thereof in a direction away from the compartment) that occurs before the energy absorbing member 20, excluding the protruded portion 22, starts to deform following impact on the windowpane regulator guide 40. Therefore, energy absorption starts at an earlier timing, and energy absorbing efficiency improves.

Figure 6:
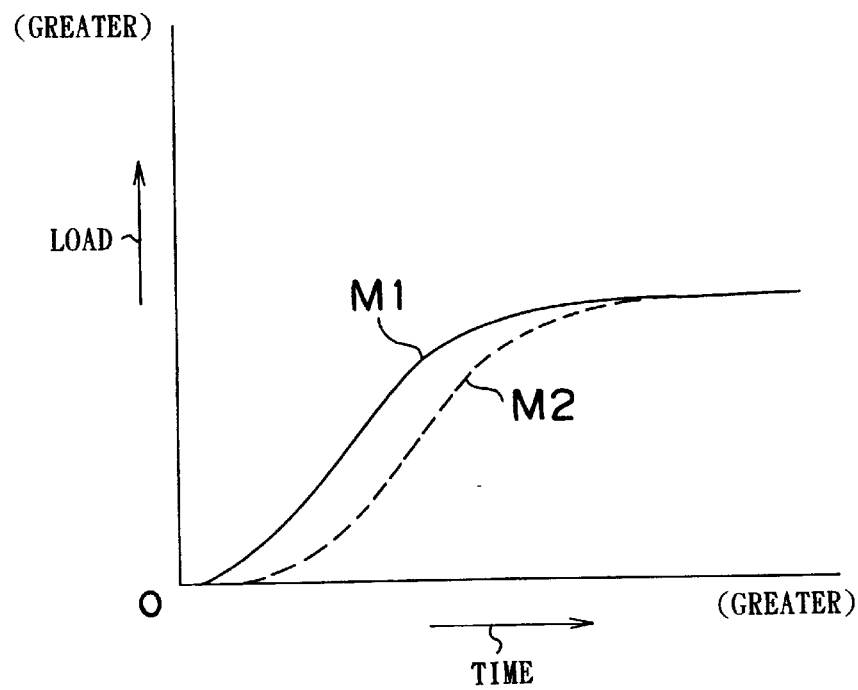
FIG. 6 is a graph indicating an impact absorption characteristic of the vehicular door energy absorbing structure of the embodiment.
Figure 8:
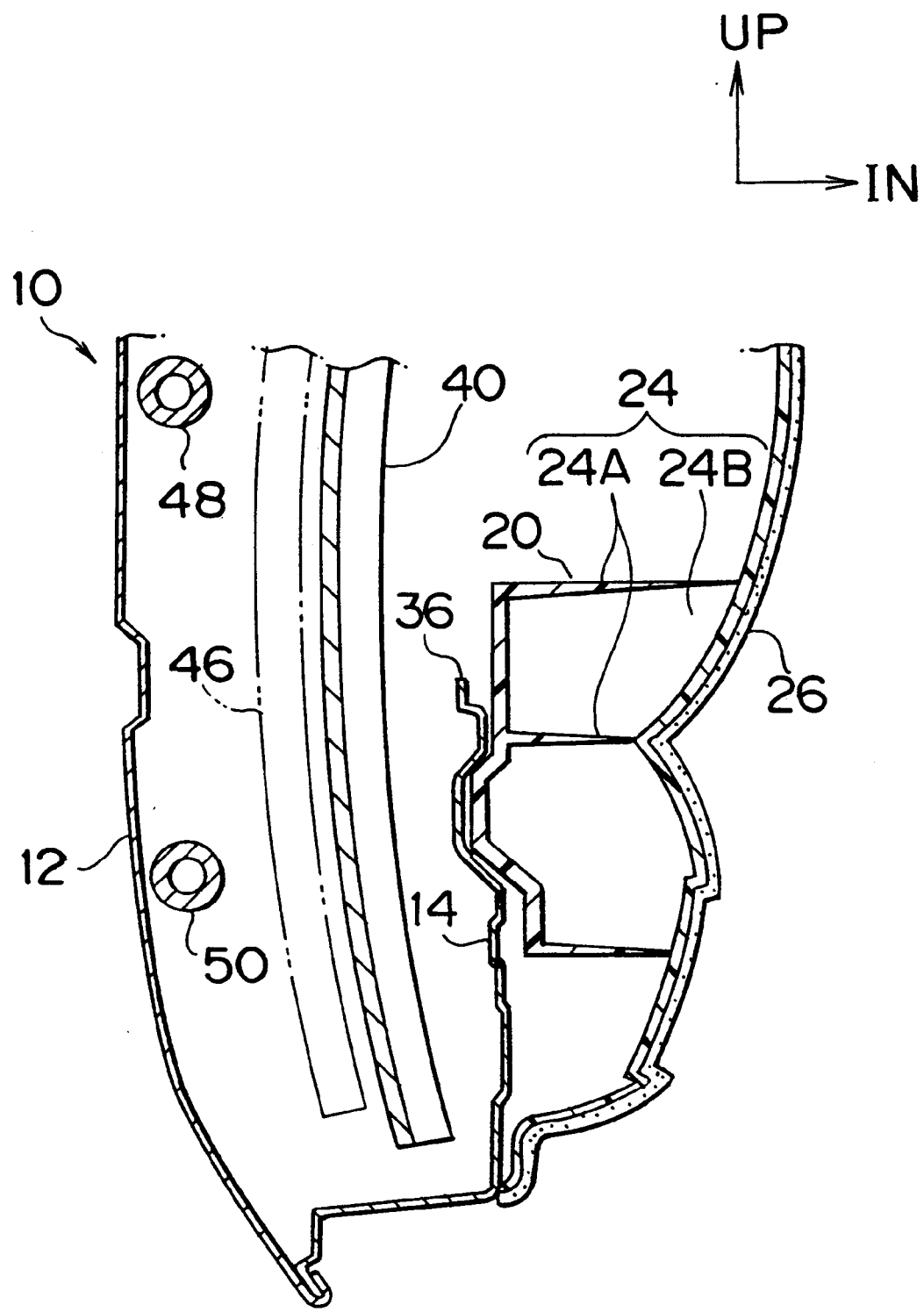
FIG. 8 is a sectional view of a comparative-example energy absorbing structure of a vehicular door, similar to the sectional view of FIG. 1.
Figure 9:
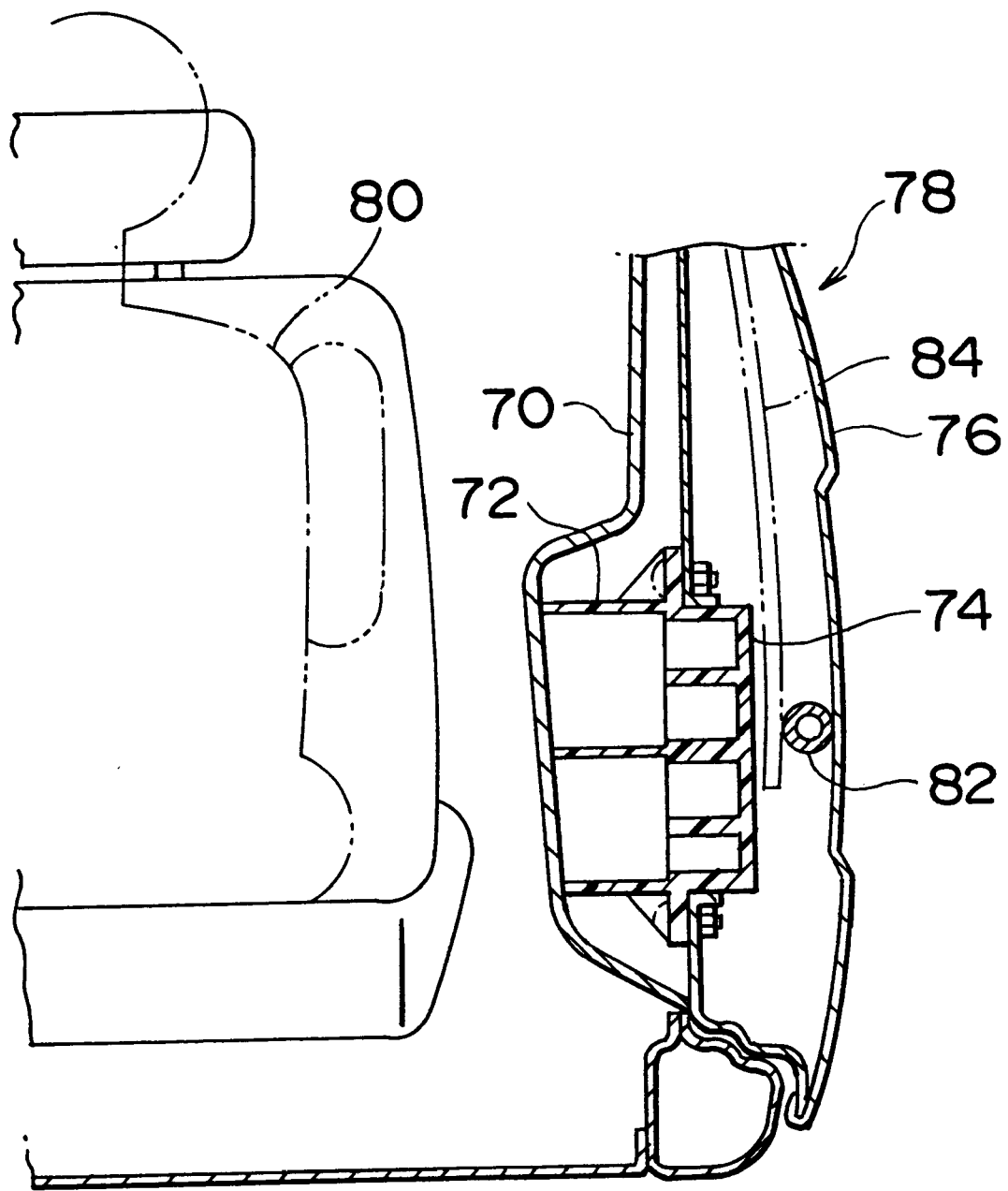
FIG. 9 is a sectional view of a related-art energy absorbing structure of a vehicular door, viewed from a forward point.

As indicated in the graph of FIG. 6, the rising of the load characteristic curve M1 (solid line in FIG. 6) of the embodiment occurs earlier than the rising of the load characteristic curve M2 (broken line) of a comparative-example vehicular door energy absorbing structure in which an energy absorbing member 20 does not have a protruded portion as shown in FIG. 8.

Figure 7:
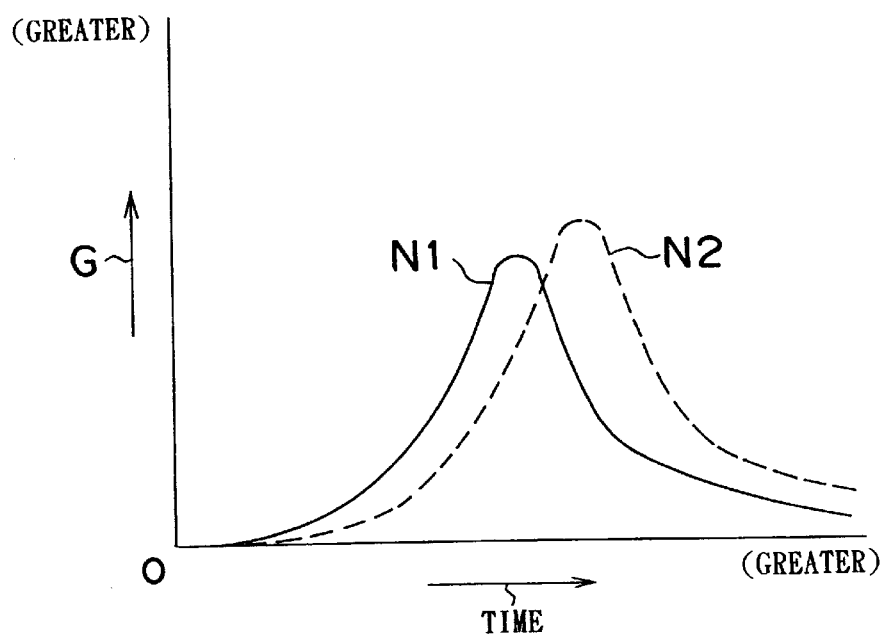
FIG. 7 is a graph indicating the acceleration G that the hip part of an occupant receives according to the vehicular door energy absorbing structure of the embodiment.

Furthermore, as indicated in the graph of FIG. 7, the rising of the characteristic curve N1 (solid line) regarding the acceleration G that the hip 30A of the occupant 30 receives according to the embodiment occurs earlier than the rising of the characteristic curve N2 (broken line) regarding the acceleration G that the hip 30A of the occupant 30 receives according to the comparative example shown in FIG. 8. Therefore, the maximum acceleration that the hip 30A of the occupant 30 receives according to the embodiment becomes lower than the maximum acceleration based on the characteristic curve N2 according to the comparative example.

In addition, since the windowpane regulator guide 40 extends substantially in the top-to-bottom directions in the embodiment, the load applied to the outer panel 12 can be transmitted to the energy absorbing member 20 via the windowpane regulator guide 40 even in a case where an another vehicle crashes into an upper or lower portion of the front side door 10. Therefore, the energy absorption by the energy absorbing member 20 starts at an earlier timing.

Further, in the embodiment, the height of the protruded portion 22 of the energy absorbing member 20 in the top-bottom direction is positioned between the upper impact beam 48 and the lower impact beam 50, so that if another vehicle crashes into a forward portion of the door or a rearward portion of the door, the load applied to the door outer panel can be transmitted to the energy absorbing member by the impact beams and the windowpane regulator guide 40. Therefore, the energy absorption by the energy absorbing member starts earlier than it would if a vehicular door energy absorbing structure without a protruded portion was used, so that impact energy can be absorbed at a high efficiency.

Through the above-described operation, the embodiment reduces the pre-deformation displacement of the energy absorbing member and achieves an earlier start of energy absorption, thereby absorbing impact energy at a high efficiency. Furthermore, there is no need to increase the thickness of the impact absorbing member, that is, the dimension thereof in the directions of the vehicle width, in order to ensure that a predetermined amount of energy will be absorbed. Consequently, a wide or large compartment space can be provided.

Further, in the embodiment, the protruded portion 22 of the energy absorbing member 20, protruding from the service hole 36 formed in the inner panel 14 for an assembling operation or the like, contacts the windowpane regulator guide 40 at the time of an impact. Therefore, there is no need to provide a separate reinforcement for the protruded portion 22 of the energy absorbing member 20 to contact, and there is no need to form a separate opening in the inner panel 14 for the protruded portion 22 of the energy absorbing member 20 extend or move through. The production is thus facilitated.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements. For example, in a door in which a windowpane regulator guide is not provided at a side closer to an occupant sitting position, it is also possible to use a reinforcing member in stead of the windowpane regulator guide 40. In a door in which a service hole is not formed at a desired position, it is also possible to form an opening in place of the service hole 36. Furthermore, the invention is applicable not only to front side doors but also to other doors such as rear side doors.

In the foregoing embodiment, the rib thickness, pitch and the like of the reinforcing ribs 22A may be pre-adjusted so that the reinforcing ribs 22A substantially resist buckling despite a load caused by an impact. It is also possible to adjust the rib thickness, pitch and the like of the reinforcing ribs 22A so that if a very large impact load occurs, the reinforcing ribs 22A buckle to absorb impact energy after the buckling of the bucking ribs 24 (at a later timing during an impact).

What is claimed is:

1. An energy-absorbing structure of a vehicular door, comprising:
an energy-absorbing member provided between a door inner panel and a door trim, wherein the energy-absorbing member has a protruding portion that is integrally formed with and extends from a side of the energy-absorbing member, the side from which the protruding portion extends being opposite from a passenger compartment-facing side of the energy-absorbing member, and wherein the protruded portion is constructed and arranged to resist deformation at the time of an impact; and a reinforcing member fixed to the door, extending in an up-down direction and disposed at a passenger compartment-facing side of a door glass pane, wherein the protruding portion of the energy-absorbing member faces the reinforcing member through an opening formed in the door inner panel.

2. An energy-absorbing structure of a vehicular door according to claim 1, wherein the reinforcing member is fixed at an upper end portion thereof and a lower end portion thereof to the door inner panel.

3. An energy-absorbing structure of a vehicular door according to claim 2, wherein the reinforcing member is a windowpane regulator guide.

4. An energy-absorbing structure of a vehicular door according to claim wherein the opening is a service hole.

5. An energy-absorbing structure of a vehicular door according to claim 1, wherein the energy-absorbing member has a plurality of buckling ribs.

6. An energy-absorbing structure of a vehicular door according to claim 5, wherein the plurality of buckling ribs of the energy-absorbing member are grating ribs including at least one horizontal rib extending in a front-rear direction relative to a vehicle and at least one vertical rib extending in a top-bottom direction relative to the vehicle.

7. An energy-absorbing structure of a vehicular door according to claim 1, wherein the energy-absorbing member has a relatively thick wall portion on a surface of the energy-absorbing member so as to resist bending deformation, the surface being relatively close to the door inner panel.

8. An energy-absorbing structure of a vehicular door according to claim 7, wherein the protruding portion is formed in a substantially front-to-rear middle portion of an upper end portion of the surface of the energy-absorbing member, the surface being relatively close to the door inner panel.

9. An energy-absorbing structure of a vehicular door according to claim 1, wherein the protruding portion defines a plurality of reinforcing ribs in an inner space at least partially defined by the protruding portion.

10. An energy-absorbing structure of a vehicular door according to claim 9, wherein the energy-absorbing member has a plurality of buckling ribs, and wherein a pitch of the reinforcing ribs is smaller than a pitch of the buckling ribs.

11. An energy-absorbing structure of a vehicular door according to claim 10, wherein the energy-absorbing member is constructed such that at the time of an impact on said energy-absorbing member, the reinforcing ribs deform and absorb energy of the impact on the energy-absorbing member after the buckling ribs buckle.

12. An energy-absorbing structure of a vehicular door according to claim 1, wherein the protruding portion is filled with a resin material.

13. An energy-absorbing structure of a vehicular door according to claim 1, wherein the energy-absorbing member is disposed at such a position as to substantially face a hip part of an occupant being at a predetermined position.

14. An energy-absorbing structure of a vehicular door according to claim 1, further comprising at least one impact beam extending at a side of the reinforcing member that is opposite from the passenger compartment.

15. An energy-absorbing structure of a vehicular door according to claim 14, wherein the at least one impact beam includes a plurality of impact beams inter-spaced at a predetermined interval extending in the up-down direction relative to the vehicle, and a height of the protruded portion in the up-down direction relative to the vehicle is within the predetermined interval.

16. An energy-absorbing structure of a vehicular door according to claim 1, wherein the energy-absorbing member includes a portion facing a passenger compartment-facing side of the door inner panel and adapted to contact the passenger compartment-facing side of the door inner panel at least at the time of the impact.

17. An energy-absorbing structure of a vehicular door, comprising:

an energy-absorbing member provided between a door inner panel and a door trim; and a reinforcing member fixed to the door, extending in an up-down direction, wherein the energy-absorbing member has a protruding portion that is integrally formed with and extends from a side of the energy-absorbing member, the side from which the protruding portion extends being opposite from a passenger compartment-facing side of the energy-absorbing member, and the protruding portion is constructed and arranged to resist deformation at the time of an impact, and wherein the protruding portion faces the reinforcing member through an opening formed in the door inner panel and defines a plurality of reinforcing ribs in an inner space at least partially defined by the protruding portion.

18. An energy-absorbing structure of a vehicular door according to claim 17, wherein the energy-absorbing member has a plurality of buckling ribs, and wherein a pitch of the plurality of reinforcing ribs is smaller than a pitch of the plurality of buckling ribs.

19. An energy-absorbing structure of a vehicular door according to claim 18, wherein the energy-absorbing member is constructed such that at the time of the impact on said energy-absorbing member, the plurality of reinforcing ribs deform and absorb energy of the impact on the energy-absorbing member after the plurality of buckling ribs buckle.

* * * * *